United States Patent
Ayers et al.

(10) Patent No.: US 7,682,105 B2
(45) Date of Patent: Mar. 23, 2010

(54) COVER SYSTEM FOR WASTE SITES AND ENVIRONMENTAL CLOSURES

(76) Inventors: Michael R. Ayers, 3530 Waters Cove Way, Alpharetta, GA (US) 30027; Jose L. Urrutia, 3665 Ansley Park Dr., Suwanee, GA (US) 30024

( * ) Notice: Subject to any disclaimer, the term of this patent is extended or adjusted under 35 U.S.C. 154(b) by 117 days.

(21) Appl. No.: 11/900,831

(22) Filed: Sep. 13, 2007

(65) Prior Publication Data
US 2008/0069642 A1 Mar. 20, 2008

Related U.S. Application Data

(60) Provisional application No. 60/844,576, filed on Sep. 14, 2006.

(51) Int. Cl.
*B09B 1/00* (2006.01)
*B09C 1/00* (2006.01)

(52) U.S. Cl. .............. 405/129.85; 405/129.1; 405/129.45; 405/129.55; 405/129.75

(58) Field of Classification Search ............. 405/129.1, 405/129.45, 129.55, 129.75, 129.85
See application file for complete search history.

(56) References Cited

U.S. PATENT DOCUMENTS

| | | | |
|---|---|---|---|
| 4,946,719 A * | 8/1990 | Dempsey | ............ 428/17 |
| 5,056,960 A | 10/1991 | Marienfeld | |
| 5,065,960 A | 11/1991 | Castellucci | |
| 5,249,893 A | 10/1993 | Romanek et al. | |
| 5,258,217 A | 11/1993 | Lewis | |
| 5,358,356 A | 10/1994 | Romanek et al. | |
| 5,364,206 A | 11/1994 | Marienfeld | |
| 5,690,448 A * | 11/1997 | Fasullo et al. | ............ 405/129.7 |
| 5,876,745 A | 3/1999 | Muraoka et al. | |
| 5,976,645 A | 11/1999 | Daluise et al. | |
| 6,187,423 B1 | 2/2001 | Maeger et al. | |
| 6,517,282 B2 | 2/2003 | Marsteller et al. | |
| 6,692,186 B1 | 2/2004 | Suazo et al. | |
| 6,858,272 B2 | 2/2005 | Squires | |
| 6,860,953 B1 * | 3/2005 | Grizzle et al. | ............ 156/72 |
| 6,877,932 B2 | 4/2005 | Prevost | |
| 6,946,181 B2 | 9/2005 | Prevost | |
| 2004/0086664 A1 * | 5/2004 | Seaton | ............ 428/17 |
| 2005/0154097 A1 * | 7/2005 | Bonora | ............ 524/90 |

FOREIGN PATENT DOCUMENTS

WO   WO 2005/042846   5/2005

* cited by examiner

*Primary Examiner*—David J Bagnell
*Assistant Examiner*—Nicholas A Wilbur
(74) *Attorney, Agent, or Firm*—Baker Donelson Bearman Caldwell & Berkowitz PC

(57) ABSTRACT

A cover system is provided for waste sites and environmental closures, in which the cover system comprises a synthetic grass and an impermeable geomembrane that can be applied without the use of heavy earthwork equipment as temporary or final cover to control odors, erosion, gas migration and contaminate migration. The invention allows installation on very steep slopes and does not require the use of an extensive anchoring system to resist wind uplift or slope failure.

8 Claims, 12 Drawing Sheets

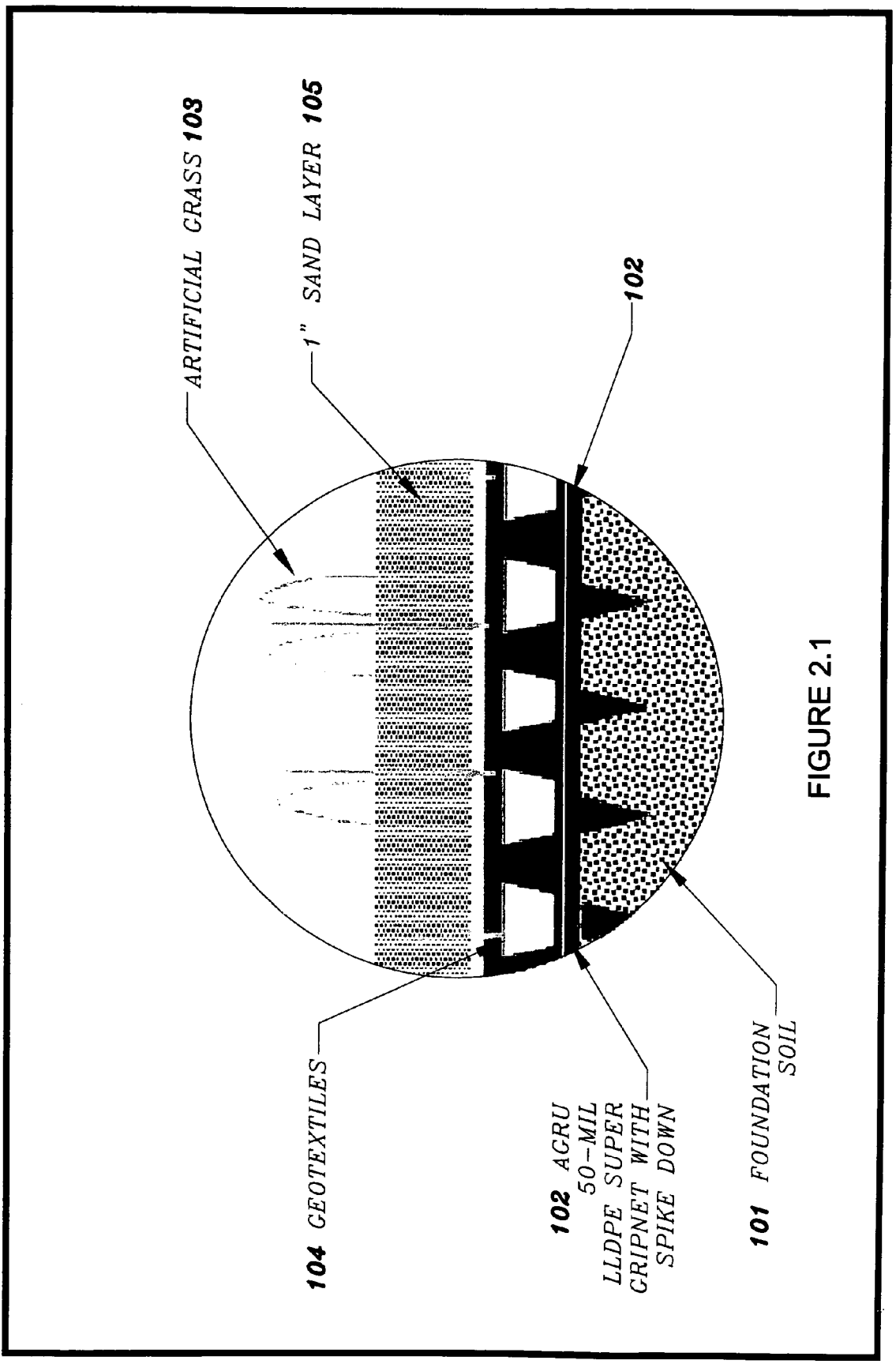
FIGURE 2.1

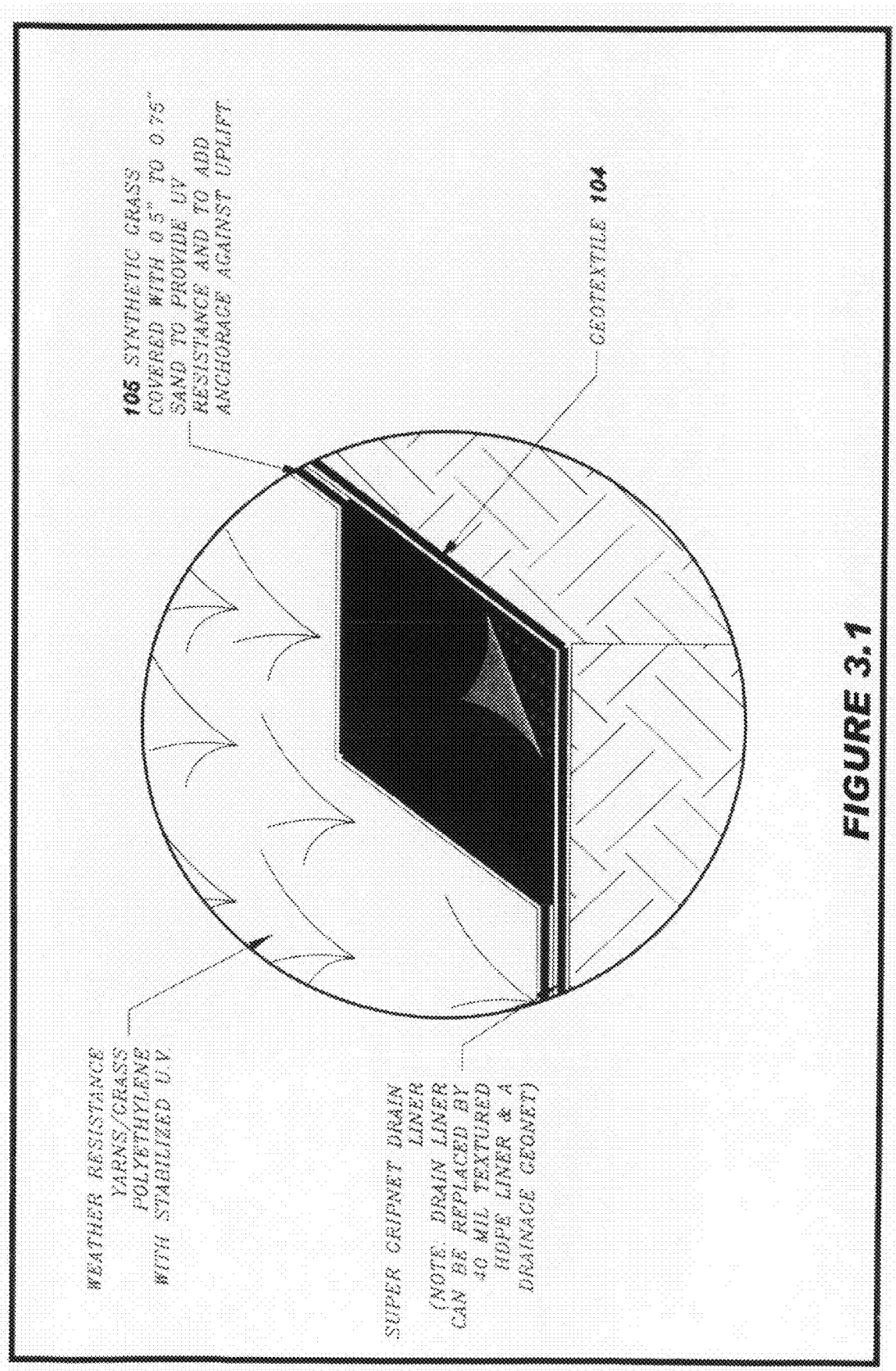
FIGURE 3.1

FIGURE 6.1

| TEST NO. | FLOW DIRECTION | SPECIMEN SIZE WIDTH x LENGTH (in. x in.) | NORMAL STRESS (psf) | SEATING TIME (hour) | HYDRAULIC GRADIENT (-) | TRANSMISSIVITY (m^2/sec) | FLOW RATE (gpm/ft) | FLOW RATE (ft^3/hr/ft) |
|---|---|---|---|---|---|---|---|---|
| 1 | MD | 12x12 | 50 | 0.25 | 0.10 | 3.52E-03 | 1.7 | 21.1 |
| 2 | MD | 12x12 | 50 | 0.25 | 0.33 | 2.38E-03 | 3.8 | 47.2 |
| 3 | MD | 12x12 | 50 | 0.25 | 0.50 | 2.07E-03 | 5.0 | 62.1 |

| FLOW DIRECTION | HYDRAULIC GRADIENT $i$ (—) | TRANSMISSIVITY ($m^2/sec$) | FLOW RATE (gpm/ft) | FLOW RATE ($ft^3/hr/ft$) | RAINFALL INTENSITY $R$ (ft/hr) | SLOPE ANGLE $\alpha$ (degree) | CRITICAL SLOPE LENGTH $L_{cr} = q/R \cos \alpha$ (ft) |
|---|---|---|---|---|---|---|---|
| MD | 0.10 | 3.52E-03 | 1.7 | 13.6 | 0.333 | 5.7 | 41 |
| MD | 0.33 | 2.38E-03 | 3.8 | 30.5 | 0.333 | 19.3 | 97 |
| MD | 0.50 | 2.07E-03 | 5.0 | 40.1 | 0.333 | 30.0 | 139 |

FIGURE 8

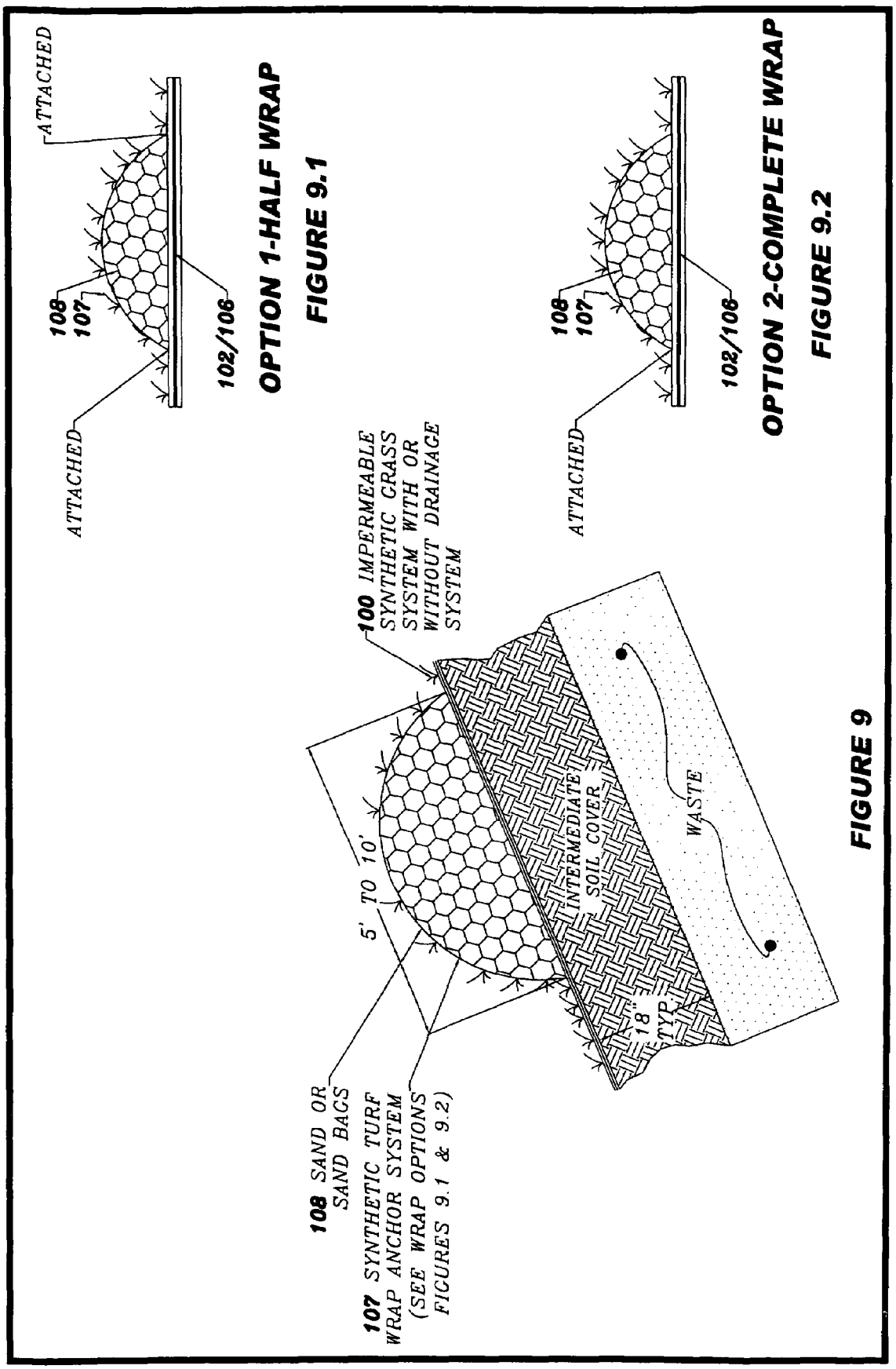

COVER SYSTEM FOR WASTE SITES AND ENVIRONMENTAL CLOSURES

This application claims the benefit of U.S. Provisional Patent Application Ser. No. 60/844,576, filed Sep. 14, 2006.

TECHNICAL FIELD

This invention relates to a cover system for waste disposal sites and environmental closures. In a more specific aspect, this invention relates to a cover system for waste disposal sites and other environmental closures, wherein the cover system comprises synthetic grass and an impermeable geomembrane. In another more specific aspect, this invention relates to such a cover system which includes a drainage system comprising a synthetic drainage component.

In this application, the following terms will be understood to have the indicated definitions:
- waste sites—refers to sites where waste is deposited, such as landfills, phosphogypsum stacks, environmentally impacted land, leach pads, mining spoils and environmental closures or material stockpiles that require a closure system.
- synthetic grass—refers to a composite of at least two geotextiles (woven or nonwoven) tufted with synthetic yarns or strands that has the appearance of grass.
- geomembrane—refers to a conventional and textured polymeric material, such as high density polyethylene, very low density polyethylene, linear low density polyethylene, polyvinyl chloride, etc.

BACKGROUND OF THE INVENTION

The prior art discloses systems for the closure of various landfill and other sites. However, such covers with an exposed membrane generally have negative aesthetics. Additionally, the prior art generally requires multiple anchors and very closely spaced trenches to resist wind uplift on the exposed membrane. Thus, the industry continues to search for improved cover systems which are effective, economical and meet the various local, state and federal environmental laws, rules and guidelines for these systems.

Artificial grass has been extensively used in sport arenas as well as airport runways and general landscaping. A primary consideration of artificial turf playing fields is the ability of the field to drain. Examples of prior art in synthetic grass drainage are U.S. Pat. Nos. 5,876,745; 6,858,272; 6,877,932 and 6,946,181. However, these applications are generally only for field playing surfaces where the ground is substantially flat and the concern is only with the ability to improve field playing conditions.

The drainage use in the prior art deals principally with slow infiltration of flat surfaces to avoid inundation of the field, and such drainage use generally cannot handle the very large and rapid run-off that would occur on very large and steep sideslopes of landfills and mine stockpiles.

Therefore, a need exists for a more efficient cover system for a synthetic grass turf and a membrane assembly that can be installed on very steep surfaces while meeting the impermeability requirements of environmental closures.

SUMMARY OF THE INVENTION

Briefly described, the present invention provides a new and useful system for covering (i.e., closing) various types of sites where waste is deposited. More particularly, the cover system of this invention comprises a composite of at least two geotextiles which are tufted with synthetic yarns and an impermeable geomembrane which is comprised of a polymeric material, and optionally a synthetic drainage component.

The cover system of the present invention eliminates or at least reduces emissions from the waste and, in addition, either reduces or eliminates the infiltration of water into the underlying waste.

This invention relates to combining an impermeable liner with synthetic turf that provides a natural grass like appearance to the final cover. The cover system of this invention generally use a drain liner (such as that shown in U.S. Pat. No. 5,258,217) to provide drainage of the system in very steep slopes. The invention also allows for other drainage systems (such as a high density polyethylene drainage net) to be used on top of a roughened textured geomembrane.

In applications where hydraulic transmissivity is not a factor, the synthetic turf can be placed directly on top of a roughened textured geomembrane anchored through the use of a sand anchor wrap and/or through the use of anchor trenches.

BRIEF DESCRIPTION OF THE DRAWINGS

FIG. 2.1 shows the encircled portion of FIG. 2 in enlarged detail.

FIG. 3.1 shows the encircled portion of FIG. 3 in enlarged detail.

FIG. 6.1 shows the results of transmissivity testing of FIG. 6 in graph form.

FIG. 8 is a table showing critical length results for a large rainfall intensity of 4 inch/hr at varying slope angles.

FIG. 9 is a view in cross-section of an alternative anchoring system according to the present invention.

FIG. 9.1 shows the half wrap option of the alternative anchoring system of FIG. 9.

FIG. 9.2 shows the complete wrap option of the alternative anchoring system of FIG. 9.

DETAILED DESCRIPTION OF THE INVENTION

Figures 1, 2:
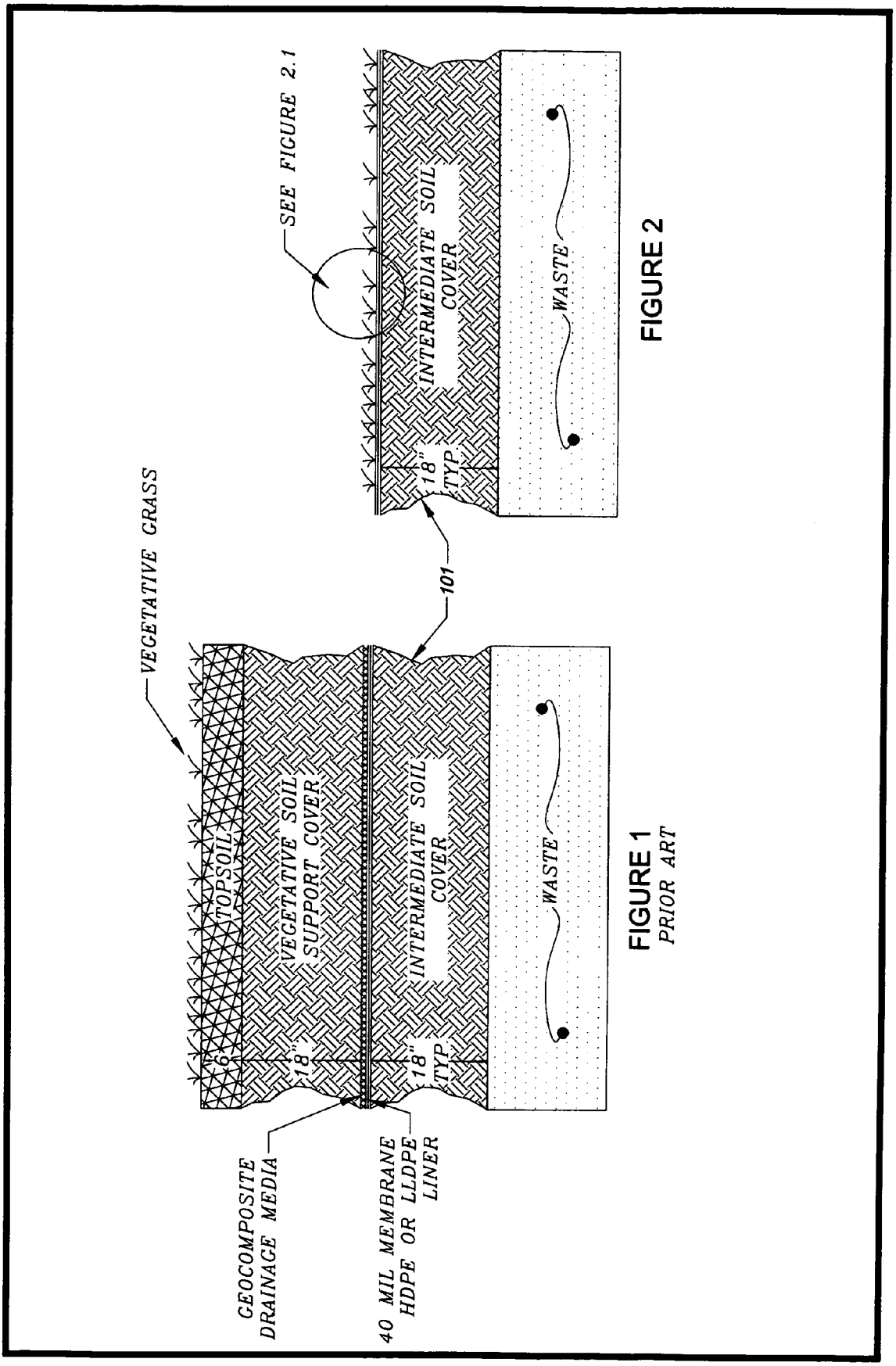
FIG. 1 is a view in cross-section of a typical final cover system as described in current EPA Federal Regulations and used in the covers of landfills and mines.
FIG. 2 is a view in cross-section of a cover system according to the present invention with an encircled portion.

The present invention provides a cover or closing system for sites where various types of waste have been deposited. As noted above, these sites can include landfills, phosphogypsum stacks, leach pads, mine spoils, soil stockpiles, etc.

In the present invention, a synthetic grass is used in combination with an impermeable geomembrane to provide a new and useful cover system. This combination (sometimes referred to as a composite material) can be used in the slopes and crowns of the waste sites.

The cover system of this invention represents an innovative and economic approach to hazardous and solid waste landfills and other environmental closures. These facilities are typically required to be closed with a final cover consisting of layers of soils and geosynthetic materials. The purposes of the cover system of this invention are to prevent exposure of the waste to the environment, to enhance collection of landfill gas and to minimize infiltration of storm water which results in leachate in the landfill.

With the cover system of this invention, owners and operators can realize significant cost savings by constructing a cover system with synthetic grass that does not require the vegetative support and topsoil layer of the typical final cover system. The synthetic grass/impermeable layer of this invention is particularly applicable to sites where the design life of the cover system is relatively short (i.e., 10 to 20 years), when future removal of the cover may be required (e.g., for landfill reclamation), when the landfill slopes are too steep to allow for the placement of soil on top of the liner, when cover soil is not readily available, when the landfill may be expanded vertically at a later date or simply to allow the construction of rapid closures to control emissions and odors.

The cover system of this invention is preferably designed with (1) a lower impermeable layer placed over the soil intermediate cover comprising a drain liner geomembrane (or textured geomembrane liner) and a geonet drainage media, or alternatively a drain liner with studs incorporated in the high density polyethylene sheet that acts as drainage; (2) a synthetic grass that is engineered with polyethylene fibers with a length of 2 to 2.5 inches tufted into two fabrics consisting of needle punch non-woven polyester and woven polypropylene geotextiles; and (3) a sand layer of about 0.5 to about 1.0 inches that is placed as infill to ballast the material and protect the system against wind uplift. The sand will provide additional protection of the geotextiles against ultraviolet light.

The synthetic grass technology was originally developed primarily for professional sport venues. The polyethylene yarns durability against UV light lends itself well to the closure cover on environmental projects. On landfills and mine piles, sliding of the cover along steep sideslopes is of primary concern, particularly after major storm events. The present invention is designed to resist sliding failure through friction and drainage elements incorporated into the cover system. The permeable turf percolates at different rates, such as approximately a rate of 180 gallons/sq ft/hr (0.2 cm/sec) or faster. During a rain event, the rainfall will penetrate quickly through the sand infill and drain directly in the geocomposite drainage system below to minimize erosion and maintain stability of the sand infill. The infill is also held in place by the synthetic grass that traps the sand to anchor and ballast the synthetic grass turf to the surface it covers.

If concerns associated with long-term survivability of the product prevent regulatory approval for final exit closure (i.e. no further regulatory actions required to achieve an approved final closure), the proposed synthetic grass could then be simply covered with 2 feet of soil.

The materials of this invention have been tested under this scenario (200 lbs/sq. ft) using ASTM transmissivity testing. The system will perform as in the conventional U.S. EPA Subtitle "D" caps since the geocomposite drainage media used for drainage above the geomembrane to improve stability already exists. Refer to FIG. 1.

With this invention, however, an anchoring system typically associated with exposed geomembrane covers will not be required. The turf is ballasted with approximately about 0.5 to about 1.0 inch of sand infill, which produces a weight of about 5 to about 10 pounds per square foot. The infill is held in place by the artificial blade polyethylene fiber tufted to the lower geotextiles. This geometry traps the sand to anchor and ballast the turf product to the surface covered by the synthetic grass.

The selection of the chemical composition of the synthetic grass/impermeable membrane is a critical element of the present invention. The polymer should resist exposure to sunlight, which generates heat and contains ultraviolet radiation. The polymer yarns should not become brittle when subjected to low temperatures. The selection of the synthetic grass color and texture should be aesthetically pleasing.

The actual grass like component preferably will consist of polyethylene fibers of about 2 to about 2.5 inches in length tufted into a black woven and a gray non-woven geotextile. For added strength in severely steep sideslopes, an additional mesh backing can be tufted for improving dimensional stability. The polyethylene grass filaments preferably have an extended operational life of at least 15 years.

This invention combines the use of a synthetic grass on final landfill covers to provide a pleasant visual appearance and provides a drainage system that can handle the very rapid run-off. Thus, the cover system of this invention can be installed on very steep slopes which typically occur in landfills and stockpiles. This invention also provides for anchoring to resist significant uplift forces caused by high wind loads.

There are many advantages to the cover system of this invention, such as:

There is an absence of soil cover, which will reduce construction costs depending on the availability of soil at the site.

Reduces annual operation and maintenance requirement while providing superior and reliable/consistent aesthetics.

Reduces the post closure maintenance costs of the cover.

Reduces the need for expensive riprap channels and drainage benches, with substantially no erosion or siltation problems, even during severe weather.

Better for landfills in sensitive areas where soil erosion and sedimentation are major concerns because soil loss is substantially reduced during operations and post-closure. Eliminates the need for additional borrow sources, siltation ponds and associated environmental construction impacts.

Allows for steeper waste pile slopes, because there will be a reduced risk of soil stability problems, such as resulting from earthquakes or gas pressure build-up.

Reduces infiltration through the cap. Surface water is rapidly drained off and is not restricted by the hydraulic conductivity of the cover system. As a result, the hydraulic head on the impermeable layer and subsequent infiltration into the waste is minimized. HELP (Hydraulic Evaluation of Landfill Performance) infiltration models show that this type of cover will have less infiltration than current covers allowed by federal regulations.

Enhanced visual inspection. Because the synthetic materials are exposed, the cover system of this invention is easily inspected for damage which, if identified, may be easily and inexpensively repaired. Also the majority of damage to the synthetics caps is produced by the earthwork equipment during soil placement. By eliminating the soil layer with this cover system, this is no longer an issue.

Allows faster capping and installation during the operational life of the landfill and during wintertime. Faster capping reduces odors, improves gas collection efficiency and enhances compliance with federal air quality regulations.

Easier access to landfill materials for reclamation in the event of future landfill reclamation for future piggyback areas or future waste lifts due to waste settlement or vertical expansion. The composite material of this invention allows the owners access to the waste without having to remove the existing cover soils of a typical and traditional final cover system.

Reduces wildlife impacts on the cover because there is no food or organic matter. This is important in landfills located in coastal areas or those facilities located near airports.

An alternative closure (i.e., a cover system according to the present invention and intended for use up to a period of about 15 years) can be used under the following conditions:

On areas that will be overfilled or mined in the future.

To limit landfill leachate generation before final closure occurs.

To allow the waste subgrade to gain strength and allow for additional waste placement in the future.

As a means to control landfill gas or odors by enhancing collection capabilities.

As a partial final cover and delay future capital associated with the soil cover.

Reduce operational costs for grass cutting and erosion control during the operative life of the facility.

As part of an agreement/consent order to control emissions and minimize odors to surrounding communities and to reduce fines and notices of violation due to soil erosion issues.

To control dust air emissions due to high winds on landfills or stockpiles, particularly in areas where vegetation will not grow.

Use of this system for more than 15 years may involve periodic replacement or UV treatment of the synthetic grass component of the system.

Referring now to the drawings, in which like numbers represent like elements, FIG. 1 shows a cover system according to the prior art with an intermediate soil cover 101.

Figure 2A:
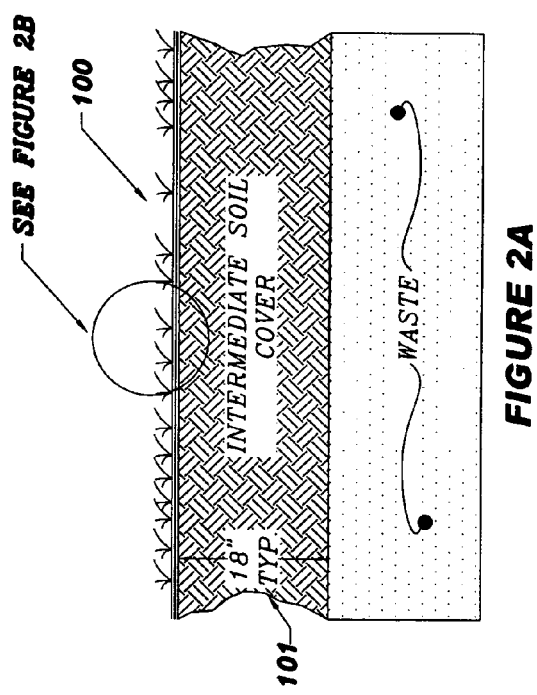
FIG. 2A is a view in cross section of a cover system according to the present invention, with an encircled portion of the cover using an alternative drainage geonet directly on top of the geomembrane as a drainage system.
Figure 2B:
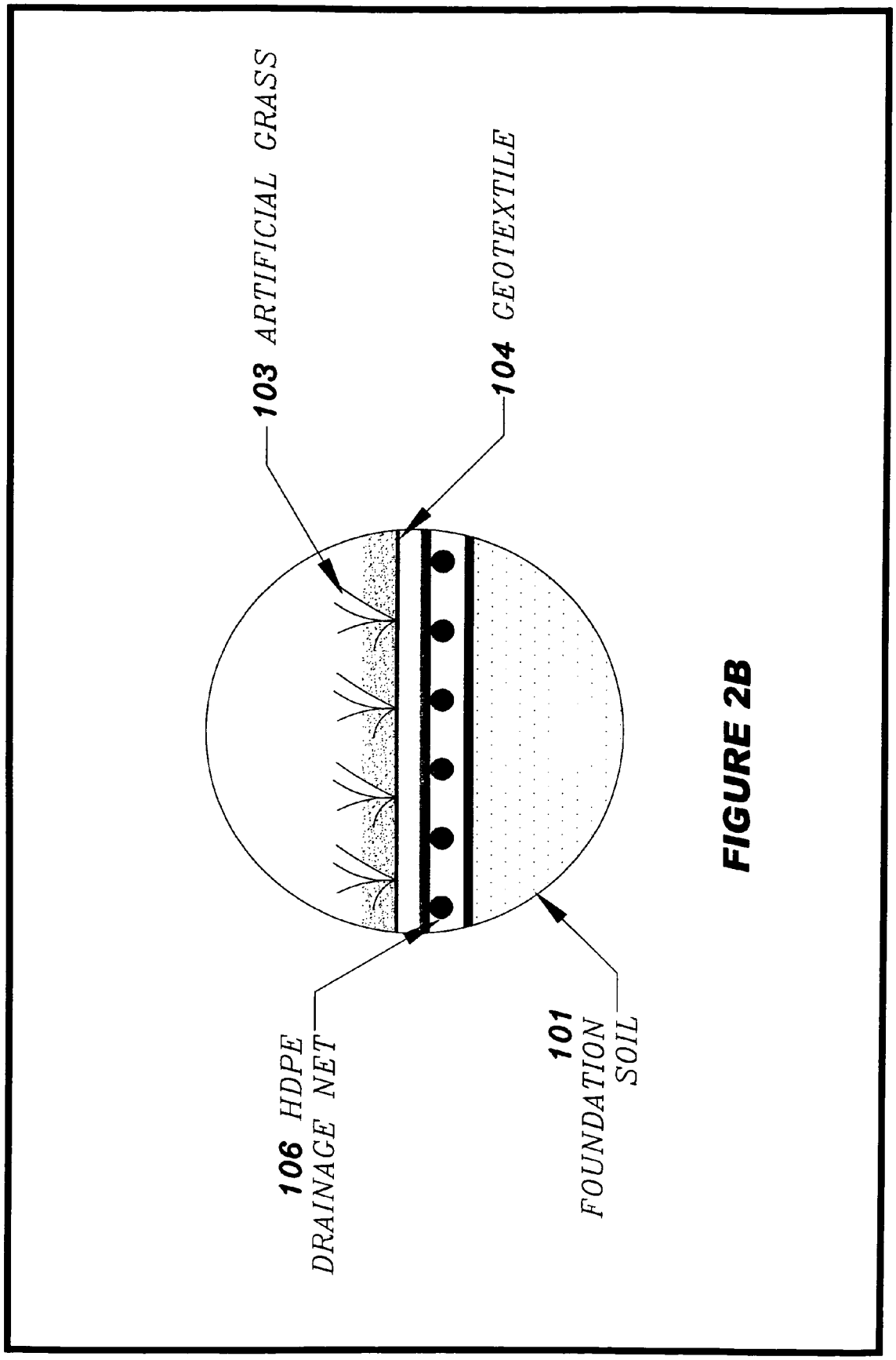
FIG. 2B shows the encircled portion of FIG. 2A in enlarged detail.
Figure 3:
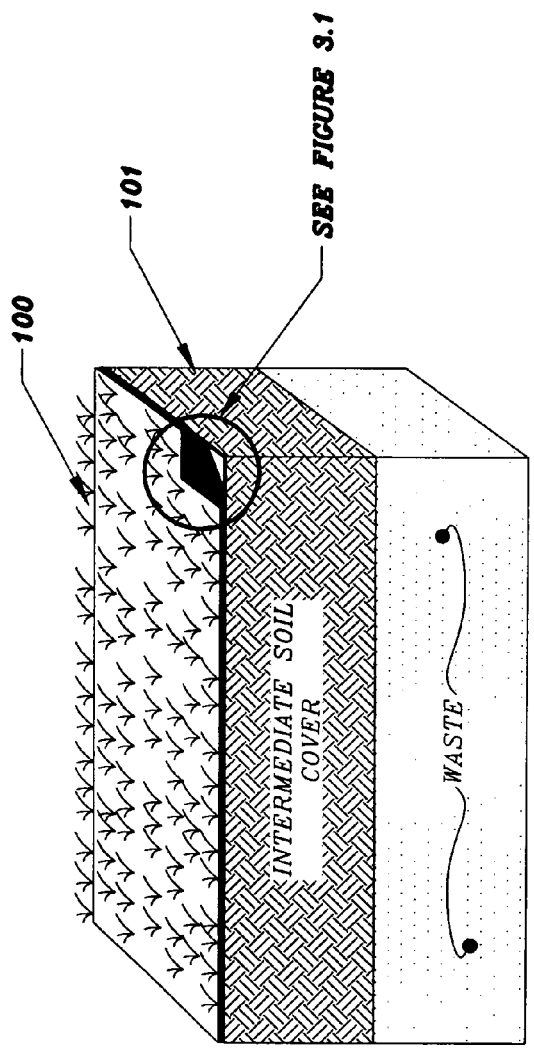
FIG. 3 is a view in cross-section of a cover system according to the present invention, with an encircled portion showing a corner portion of the cover system.

As shown by the embodiment of FIG. 2, the present invention provides a cover system 100 for draining pre-engineered synthetic turf 103/104 on top of a geomembrane 102 having studs that when covered by the bottom geotextile 104 of the turf creates a highly transmissive drainage. The synthetic turf will be used as the upper component of a landfill closure. For example, the turf can be constructed using a knitting machine that may use over 1,000 needles to produce a turf width of about 15 feet. The geomembrane is preferably made of very low density polyethylene, linear low density polyethylene (LLDPE), high density polyethylene (HDPE), or polyvinyl chloride and contains a series of studs (such as the 50-mil LLDPE sold under the trademark Super GripNet by AGRU America, Inc.). The geomembrane 102 is 22.5 feet wide and is deployed on the surface of the area of the landfill to be closed. The synthetic grass also comes in rolls 15 feet wide and is deployed directly on top of the geomembrane 102. The system is ballasted with about 0.5 to about 1.0 inch of clean sand. The geotextiles 104 of the synthetic grass prevent the sand from entering the interstices/studs of the geomembrane 102 or the high density polyethylene drainage net 106 (as shown in FIG. 2A).

Figure 6:
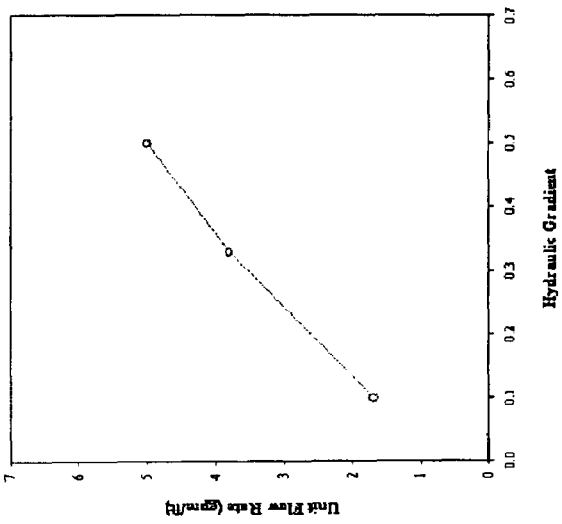
FIG. 6 shows the results of transmissivity testing on a cover system according to the present invention.

The resulting composite cover has a high transmissivity value exceeding $3.5 \times 10^{-3}$ sq.meters/sec. See FIG. 6 for actual test results. The drainage is very important because rain on the closure surface penetrates quickly through the sand and geotextiles into the lower impermeable geomembrane and is directed to a series of drainage trenches or surface benches to the site perimeter ditches and ponds (not shown).

Figure 5:
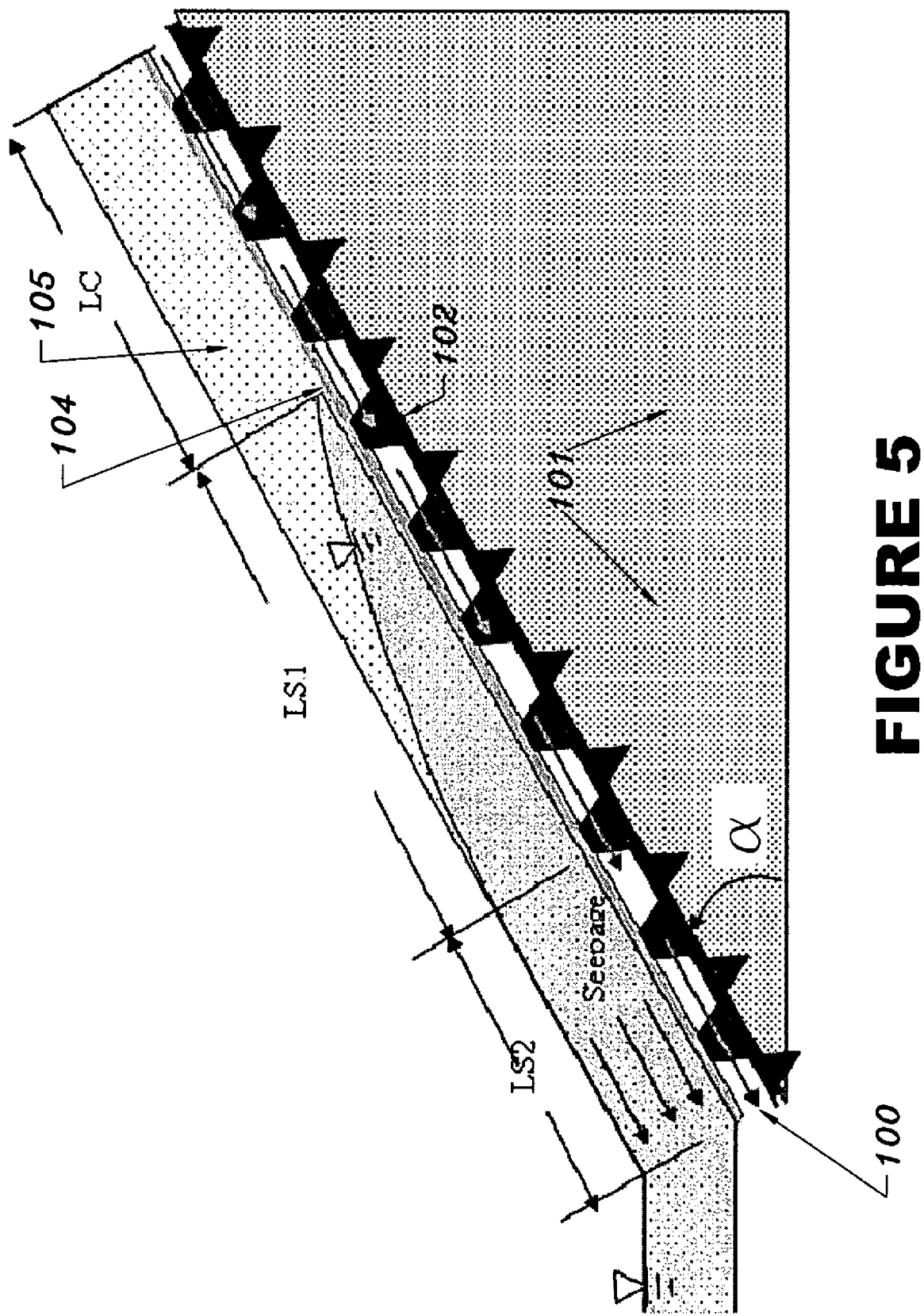
FIG. 5 is a view in cross-section of a cover system according to the present invention on a slope, showing the critical length of drainage.

This invention can be used as cover on very steep slopes (i.e., 3 horizontal:1 vertical) in landfills and other environmental applications with large man made stockpiles. To prevent the movement of the sand infill 105, it is necessary to ensure the surface water run off permeates through the sand and synthetic grass layers into the spaces between the studs of drain liner. The geomembrane 102 in this invention can transmit the water up to a certain distance (i.e., critical length) before the drainage system is flooded and run-off would start eroding or washing the sand down the slope. FIG. 5 shows the critical flow length on a slope application.

Figure 4:
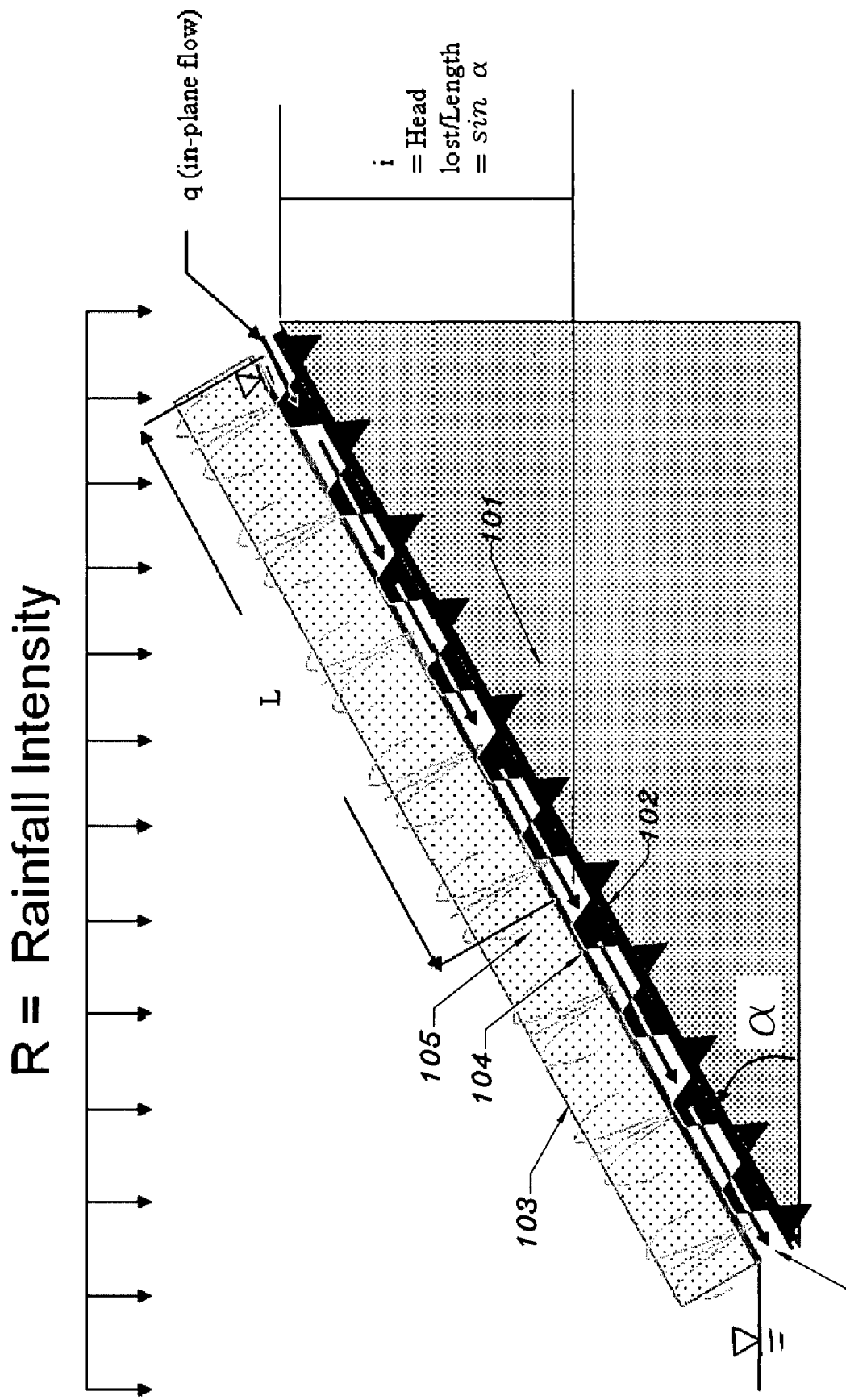
FIG. 4 is a view in cross-section of a cover system according to the present invention on a slope, showing the drainage flow.

For the cover system of this invention, the critical length for different rainfall intensities can be calculated by the following equation:

$$q \cdot t \geq R \cdot t L \cdot \cos \alpha$$

where:
q=flow rate of the drain liner at I=sin α;
t=duration;
α=angle of land fill cover slope as defined in FIGS. 4 and 5
R=rainfall intensity (ft/hour); and
L=arbitrary length measured from the slope crest (FIG. 5)
The critical drainage slope length is defined as:

$$L_{CR} = \frac{q}{R \cdot \cos \alpha}$$

Based on the transmissivity test results (refer to FIG. 6), $L_{CR}$ is calculated using a rainfall intensity R=4 in/hour (0.333 ft/hour) and shown in FIG. 8. With the above equation the drainage length of the system can be calculated depending on the design rain event. The system will then need to be drained to the typical surface water benches or trenches to the site surface water ponds. If the critical drain slope length is not of sufficient distance, then the sand could be placed in strips at designated locations only providing the anchoring requirements and avoiding the sand movement caused by saturating the drainage system and percolating of water into the sand. Anchoring can also be used through the application of a synthetic grass wrap 107 created by encasing loose sand or sandbags 108 in a synthetic grass panel and deploying parallel to the slope or with the slope. Based on the exit closure requirements, a drainage system may or may not be required except underneath the synthetic grass anchor to allow for pass-through water and water force dissipation. Refer to FIG. 9.

The seepage parallel to slope within the sand layer is calculated as follows: As shown in FIG. 5, seepage parallel to the slope within the sand layer can occur when the actual slope length is longer than $L_{CR}$. In this case (flow conditions over the slope length $L_{S2}$), the flow lines are parallel to the slope surface and the seepage force J acting on the soil volume of $L_{CR} \times h \times 1$ is equal to:

$$J = V \gamma_w \sin \alpha$$

Assuming the artificial grass interface has an effective friction angle=$\delta'$ and no adhesion, then the following force equilibrium equation is established, $$V\gamma_b \cos\alpha \tan\delta' = V\gamma_w \sin\alpha + V\gamma_b \sin\alpha$$

Figure 7:
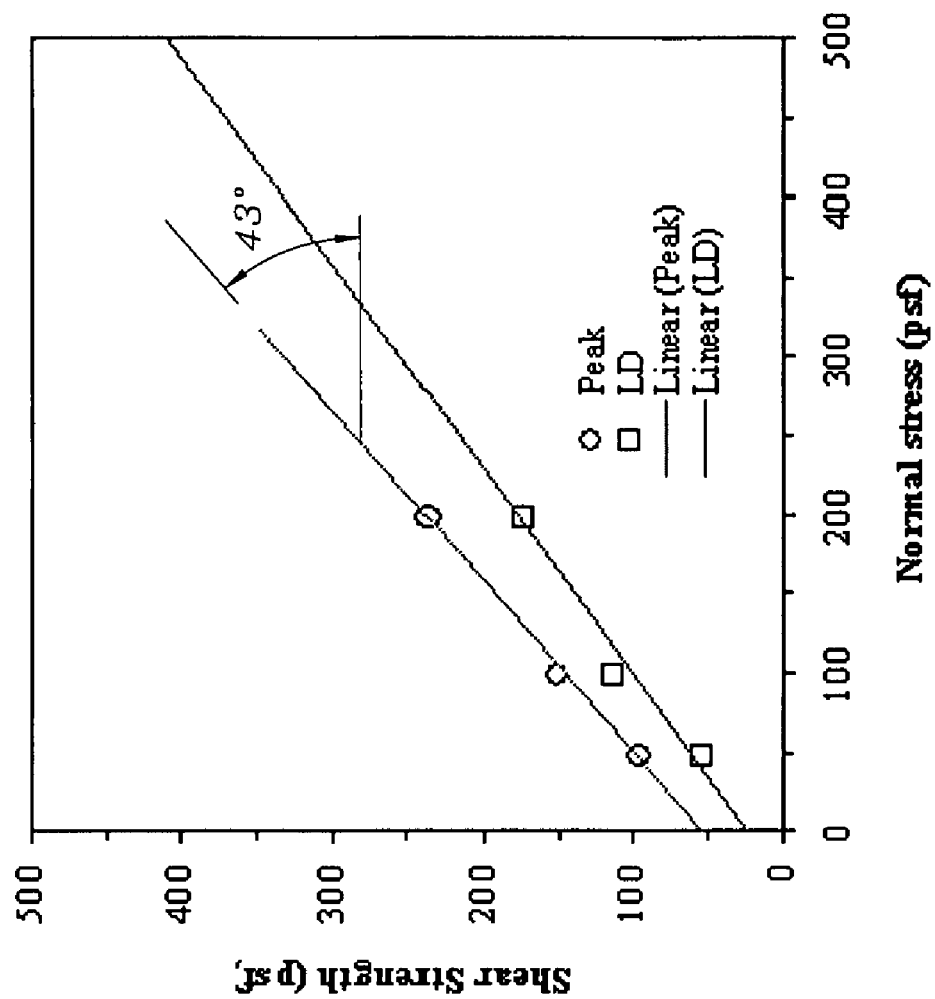
FIG. 7 shows the results of interface friction testing on a cover system according to the present invention.

This equation can be rearranged as:

$$\tan\alpha = \frac{\gamma_b}{\gamma_b + \gamma_w} \tan\delta'$$

where:
- $\alpha$=slope angle;
- $\gamma_b$=buoyant soil unit weight;
- $\gamma_w$=water unit weight; and
- $\delta'$=effective friction angle of the interface between the sand-artificial grass layer It is noted that $\gamma_b$ is approximately equal to $\gamma_w$ and the maximum possible stable slope angle is about half of $\delta'$. In other words, seepage reduces the maximum stable slope angle to about half of that for no water flowing parallel to the slope surface. From the above equation the stability of the system can be evaluated. FIG. 7 shows friction testing of the present invention. The testing shows a value of internal friction of 43 degrees, thus if the value is reduced by half then the maximum slope that the material could be placed under rainfall conditions would be at slope of 21.5 degrees which steeper than a 3 horizontal:1 vertical slope.

Materials Description

Linear low density polyethylene, polyvinyl chloride, high density polyethylene and very low density polyethylene are preferred materials for the impermeable geomembrane of this invention.

High density polyethylene drainage net over texture HDPE sheets (refer to FIG. 2A) or drain liners such as Super GripNet (refer to FIG. 2). The purpose of this component is to increase the friction coefficient of the layering system. Thus, if a two feet of soil cover, as required on top by environmental regulations, is desired for final exit closure, the friction characteristics of the system are capable of sustaining the soil cover on steep slopes.

Weather and water resistant green yarns (polyethylene 100% UV stabilized) to be used as synthetic grass component.

Geotextiles/polyethylene and polyester fabrics.

The turf is ballasted with approximately about 0.5 to about 1.0 of sand infill. Placement of the sand will be done using air pumps, spreader bars, etc., to deliver the material to the slopes.

By way of general summary, but not in limitation thereof, the present invention provides:

1. A synthetic grass turf that is combined with an impermeable geomembrane on a soil supported base to form a final or a temporary cover for landfills and other man made stockpiles
2. An impermeable geomembrane with a structurally self supporting three-dimensional spacing device (studs) that, when covered by the geotextiles of the synthetic grass, provides for a drainage system without blocking the space between the studs of the geomembrane.
3. A drainage system that will allow water to penetrate through the sand and artificial grass layers into a transmissive zone created by the studs, thus avoiding saturation and percolation into the sand and wash off the surface of the cover system.
4. A drainage system wherein the surface water in the drainage will be directed down the slope to drainage benches and down chutes at certain lateral spacing as defined by the critical length calculations described above. Surface water will then be directed to the site perimeter ditches and surface water ponds.
5. A drainage system in which the spacing drainage can comprise, instead of studs structured in the liner itself, a high-density polyethylene drainage net that is applied directly on top of a lower roughened-textured geomembrane liner to form a drainage layer.
6. A drainage system that allows the installation of the synthetic grass not only in relatively flat surfaces but also in very steep slopes like those occurring in landfills and mine stockpiles without eroding the sand off the cover system.
7. A method for providing a drainage system for a synthetic grass turf on an impermeable geomembrane for the closure of landfills by using a layering system that does not require the use of heavy earthwork equipment. The method comprises the steps:
    a. Preparing the intermediate cover supported soil in flat and stone areas;
    b. Placing an impermeable membrane on top of the intermediate soil cover used in landfills and stockpiles;
    c. Placing the drainage system on top of the geomembrane. This step can be avoided if a liner with studs drain liner is used.
    d. Laying the turf assembly on top the spacing device drainage without performing any further preparation to the drainage spacing; and
    e. Placing about 0.5 to about 1.0 inch sand layer by blowing and spreading the sand within the grass.
8. An infill layer of particulate material such as sand disposed between the upstanding yarns of polyethylene grass of a depth of less than the length of the ribbons and directly on top of the geotextiles in which the ribbons are tufted.
9. A method that provides ballast to the cover system against wind uplift created by high force winds on the mounding shape of landfills and stockpiles. This eliminates the need of extensive anchoring of the exposed geosynthetics.
10. A method that will provide for additional UV light resistance to the two geotextiles in which the polyethylene yarns are tufted.
11. A cover system for landfills and manmade stockpiles that can be converted to Subtitle "D" covers and EPA regulated covers by adding two feet of vegetative soil cover on top. The drainage system and the sand layer will provide enough transmissivity to comply with the government regulations for upper vegetated soil infiltration drainage in environmental closures.
12. A cover system that provides high internal friction values between the layers that will allow for the placement of two feet of soil on sideslopes exceeding 3 horizontal:1 vertical at a later date without sliding on the cover system.
13. A cover system for landfills in arid regions where grass or other vegetation will not grow and obtaining "air quality credits" for controlling fugitive dust emissions from wind erosion.
14. For applications not requiring a transmissive layer, the present invention can be used without the drainage component and infill, and the synthetic grass applied directly on top of the geomembrane.

This invention has been described with particular reference to certain embodiments, but variations and modifications can be made without departing from the spirit and scope of the invention.

What is claimed is:

1. A cover system for waste sites, wherein the cover system comprises:
   A. a synthetic grass which comprises a composite of at least two geotextiles tufted with synthetic yarns; and
   B. an impermeable textured geomembrane which is comprised of a polymeric material,
      wherein the cover system is used in the absence of a vegetative soil support top cover and wherein the textured geomembrane is used with a synthetic drainage component.

2. A cover system as defined by claim 1 wherein the impermeable geomembrane is selected from the group consisting of high density polyethylene, very low density polyethylene, linear low density polyethylene or polyvinyl chloride.

3. A cover system as defined by claim 2 wherein the impermeable geomembrane is comprised of linear low density polyethylene.

4. A cover system as defined by claim 2 wherein the impermeable geomembrane is comprised of high density polyethylene.

5. A cover system for waste sites, wherein the cover system comprises:
   A. a synthetic grass which comprises a composite of at least two geotextiles tufted with synthetic yarns;
   B. an impermeable textured geomembrane which is comprised of a polymeric material; and
   C. a drainage system comprising a synthetic drainage component,
      wherein the cover system is used in the absence of a vegetative soil support top cover.

6. A cover system as defined by claim 5 wherein the impermeable geomembrane is selected from the group consisting of high density polyethylene, very low density polyethylene, linear low density polyethylene or polyvinyl chloride.

7. A cover system as defined by claim 5 wherein the impermeable geomembrane is comprised of linear low density polyethylene.

8. A cover system as defined by claim 5 wherein the impermeable geomembrane is comprised of high density polyethylene.

* * * * *